(12) United States Patent
Usmani

(10) Patent No.: US 6,816,908 B1
(45) Date of Patent: Nov. 9, 2004

(54) METHOD AND APPARATUS FOR CONTROLLING REGISTRATION ACTIVITY

(75) Inventor: Farrukh Usmani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 317 days.

(21) Appl. No.: 09/690,100

(22) Filed: Oct. 16, 2000

(51) Int. Cl.$^7$ .............................................. G06F 15/16
(52) U.S. Cl. ........................ 709/229; 709/227; 709/228; 455/433; 455/434; 455/435; 455/437; 455/551
(58) Field of Search ................................. 709/229, 227, 709/228; 455/433, 434, 435, 437, 551

(56) References Cited

U.S. PATENT DOCUMENTS

| | | | | |
|---|---|---|---|---|
| 4,893,327 A | * | 1/1990 | Stern et al. | 455/453 |
| 5,581,804 A | * | 12/1996 | Cameron et al. | 455/456.1 |
| 5,590,403 A | * | 12/1996 | Cameron et al. | 455/503 |
| 5,603,084 A | | 2/1997 | Henry, Jr. et al. | |
| 5,664,005 A | * | 9/1997 | Emery et al. | 455/422.1 |
| 5,878,339 A | | 3/1999 | Zicker et al. | |
| 5,918,172 A | * | 6/1999 | Saunders et al. | 455/404.1 |
| 6,484,022 B1 | * | 11/2002 | Findikli et al. | 455/411 |

FOREIGN PATENT DOCUMENTS

| | | | |
|---|---|---|---|
| EP | 0820206 | 7/1997 | |
| EP | 0820206 A2 | * 1/1998 | ............ H04Q/7/38 |
| WO | 9841044 | 9/1998 | |

OTHER PUBLICATIONS

International Search Report, mailed Oct. 19, 2001.

* cited by examiner

*Primary Examiner*—Frantz B. Jean
(74) *Attorney, Agent, or Firm*—Phillip Wadsworth; Charles D. Brown; Howard H. Seo

(57) ABSTRACT

In a method and apparatus for controlling registration activity, transmission of a registration message from a node 100 is disabled upon a determination that an identity token is not present within a predetermined area of a memory 130. In an alternative implementation, registration activity is initiated by node 100 upon committing provisioning information, which task may include storing an identity token into predetermined area 130.

26 Claims, 4 Drawing Sheets

METHOD AND APPARATUS FOR CONTROLLING REGISTRATION ACTIVITY

BACKGROUND OF THE INVENTION

1. Field of the Invention

The present invention relates to communications systems. More particularly, the present invention relates to controlling registration activity of a node that communicates with a network.

2. Description of Related Art and General Background

A communications system comprises a communications network and a set of nodes that communicate with the network. The communications links between the network and the nodes may be wired and/or wireless. The network may also communicate with other networks, such that a node may communicate with an entity within the network, with another node connected to the network, and/or with an entity and/or a node on another network.

One example of a communications network is a local-area network (LAN), where the network may include a set of servers and the individual nodes may include workstations, personal computers, and/or peripheral devices such as storage units and printers. Another example of a communications network is a wireless network for cellular communications, where the network may include a set of base stations and administrative units (such as mobile service controllers (MSCs) and location registers) and the individual nodes may be mobile units that communicate with the base stations over a radiolink. A mobile unit may be a cellular telephone, a wireless modem connected to a computer or other data-generating device, or a wireless local loop (WLL) station. Through the base stations, the mobile units may communicate with each other and/or with devices on other networks such as the Internet and/or the public switched telephone network (PSTN).

In some systems, a node is connected to the network through a static link. For example, the individual workstations in a wired LAN are typically connected to the network in a permanent fashion. Each node connected in such a fashion may easily be identified by the physical location of its link.

In other networks, a link between a node and the network is dynamic. In a cellular telephone network or wireless LAN, for example, the link between a mobile unit and the network does not exist when the mobile unit is not powered on. Even after a link is created, its location in the network may change as the mobile unit moves from within the range of one base station to within the range of another. Therefore, it is not possible for the network to identify a node connected in this fashion simply by the location of its link.

Several essential network functions may require the ability to identify or locate a node, however. Such functions include locating a particular node for paging purposes (e.g. to notify a cellular telephone of an incoming call) and associating an active node with a known profile for purposes such a billing, message forwarding, service differentiation, etc. Therefore, it may be very important to support such identification.

In a CDMA system for cellular communications that complies with Interim Standard-95B (or 'IS-95B,' entitled "MOBILE STATION-BASE STATION COMPATIBILITY STANDARD FOR DUAL-MODE WIDEBAND SPREAD SPECTRUM CELLULAR SYSTEMS," published by the Telecommunications Industry Association/Electronics Industries Association (TIA/EIA) in Feb. 3, 1999) or Interim Standard-2000 (or 'IS-2000,' a six-part standard published by TIA/EIA July, 1999), a mobile unit is programmed with a 10-digit mobile identification number (or MIN). This number includes four digits from the mobile unit's unique electronic serial number (ESN) and six digits from an identity token that is known to the network and is programmed into the mobile unit. Presentation of this information by the mobile unit upon communication with the network allows the network to associate the particular mobile unit with a known profile that may contain information concerning service options, billing, home area, etc. This identification mechanism also enables the network to properly route transmissions (such as incoming telephone calls) that are intended to terminate at the mobile unit. Additionally, by associating the identity token with the known profile, the network may recognize and track the mobile unit as its link moves from one base station to another.

Programming of the MIN into the mobile unit occurs during an event known as 'provisioning.' Other parameters, such as the telephone number that may be used to reach the mobile unit, may also be stored in the mobile unit during provisioning. In the past, provisioning was typically performed by the service provider before delivery of the unit to the user or, alternatively, by a retailer at the point of purchase. Recently, however, the advent of over-the-air service provisioning (or OTASP, as defined in TIA/EIA Interim Standard (IS)-683-A, entitled "OVER-THE-AIR SERVICE PROVISIONING OF MOBILE STATIONS IN SPREAD SPECTRUM SYSTEMS" and published in May 1998) has made it possible to postpone the provisioning operation until some time after purchase.

Mobile units that are OTASP-capable may be sold in an unprovisioned state. Before provisioning is performed, a mobile unit may originate (i.e. place) calls, but it cannot terminate calls (i.e. receive pages) because no profile for it exists within the network (for example, the unit does not yet have a telephone number). To initiate a provisioning procedure, the mobile unit queries a base station in a predetermined manner. For example, the user may use the mobile unit to initiate a call using a particular number sequence (in North America, for example, the number '*228' has been assigned for this purpose, as indicated by the North American Numbering Plan Administration (Washington, D.C.)).

In response to a provisioning request, a base station forwards information to be stored by the mobile unit, including data relating to an identity token. Upon receiving an acknowledgement by the mobile unit that the information has been received, the base station commands the mobile unit to commit to the information (e.g. by storing it into a nonvolatile memory). After performing the commit operation, the mobile unit sends a commit acknowledgement to the network to indicate that the provisioning operation has been successfully completed.

If a commit acknowledgement is lost in transit, then the network cannot know whether the provisioning operation was completed successfully. However, the provisioned mobile unit must assume that the acknowledgement was received. In such a situation, it may happen that the mobile unit is awaiting a page from the network, while the network assumes that the mobile unit remains unprovisioned and incapable of being paged.

If the network has not yet assigned an identity token to the mobile unit, then no network identity exists for the mobile unit, and no registration attempt can succeed. In order to gain access to the network, however, the mobile unit may continue to attempt to register. Such attempts require the radio frequency (RF) transmit circuitry of the mobile unit to remain powered, thereby consuming power. Moreover, these attempts create interference in a CDMA system by adding to radiolink traffic and thereby reducing channel capacity. It is desirable to avoid these effects.

SUMMARY

In a method according to an embodiment of the present invention, a contents of an area of a memory is received (e.g. by a processor). A registration decision is made which comprises a determination of whether the contents include an identity token. This registration decision relates to enabling a transmission of a registration message.

BRIEF DESCRIPTION OF THE DRAWINGS

In the drawings, like reference numerals represent similar parts of the present invention throughout the several views and wherein.

DETAILED DESCRIPTION

Figure 1:
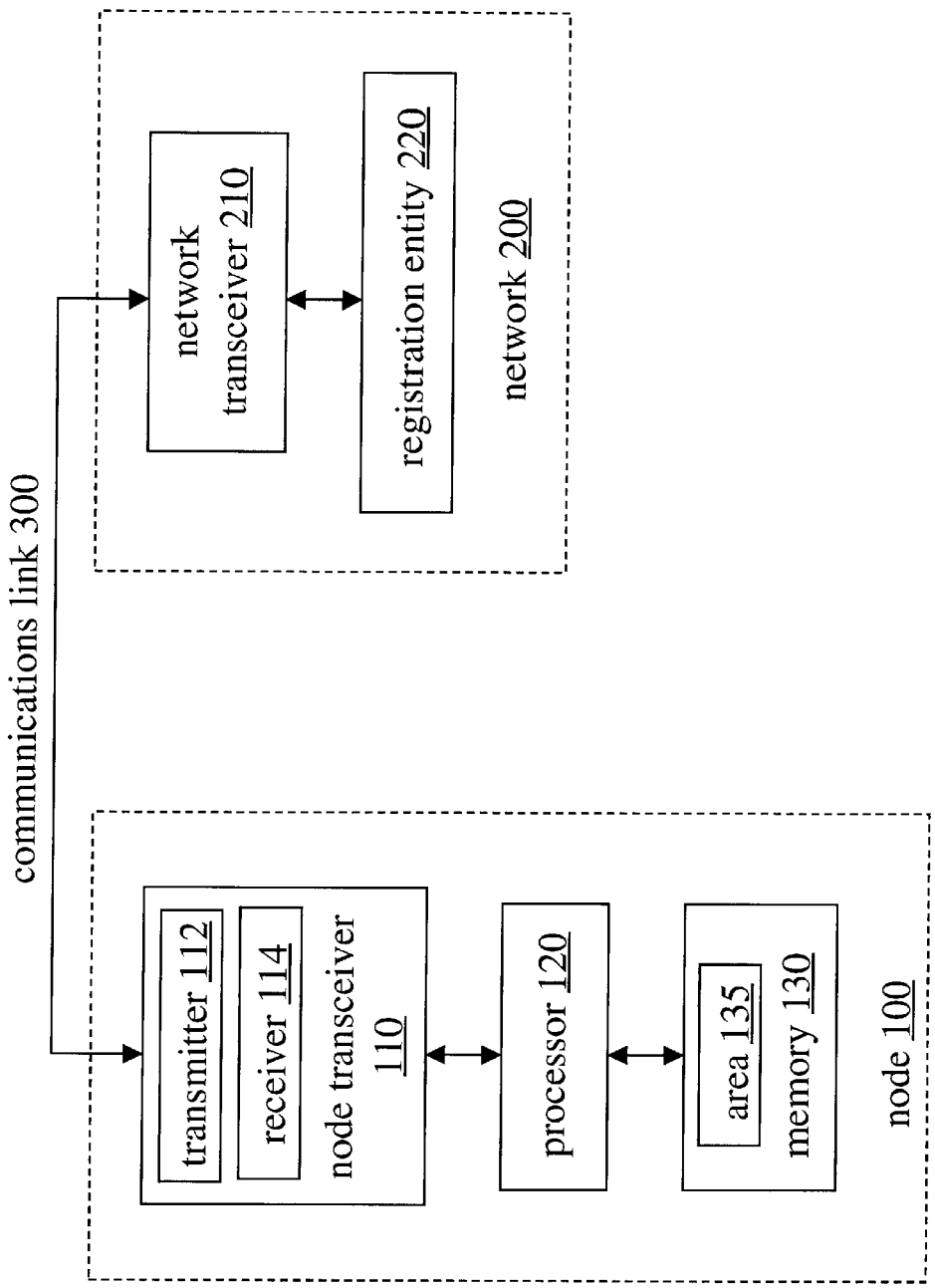
FIG. 1 illustrates a communications system comprising a network and a node.

As illustrated in FIG. 1, an apparatus according to an embodiment of the invention contains a node 100 with a node transceiver 110, a processor 120, and memory 130. Node transceiver 110 includes a transmitter 112 that allows node 100 to transmit information to a network 200 over a communications link 300. Node transceiver 110 also includes a receiver 114 that allows node 100 to receive information from network 200 over communications link 300. Such transmission and reception operations over communications link 300 may be conducted using the same or different data rates, communications protocols, carrier frequencies, and/or modulation schemes. Likewise, the operations and/or circuit configurations of transmitter 112 and receiver 114, respectively, may be completely independent of one another or, alternatively, may be partially or fully integrated.

Processor 120, which may comprise one or more microprocessors, microcontrollers, or other arrays of logic elements, controls the operation of node 100 according to a sequence of commands that may be stored in memory 130, preferably in a predetermined area 135. These commands may be entered by a user through an interface such as a keypad (not shown), and/or received from network 200 over communications link 300. Memory 130, which may comprise read-only memory (ROM), random-access memory (RAM), and/or non-volatile memory, stores programmable parameters and may also store executable instructions and/or non-programmable parameters.

Although this feature is not explicitly shown in FIG. 1, network 200 may also be coupled via a communications link to another network such as the Internet or the public switched telephone network (PSTN). This communications link may be a wired connection or a wireless link such as a microwave or satellite link, and information may be transferred across this link as one or more analog and/or digital signals.

In an exemplary implementation, node 100 is a mobile unit such as a cellular telephone. In an alternative implementation, node 100 and/or node transceiver 110 may receive and transmit information according to the wireless BLUETOOTH™ protocol (as defined in the Bluetooth Specification, ver 1.0B, published by the Bluetooth Special Interest Group, New York, N.Y.). Note, however, that it is not necessary for communications link 300 to be wireless. In a further implementation, for example, node 100 may comprise a portable device (e.g. a laptop computer) that establishes a wired but temporary communications link 300 to network 200 by connecting to a terminal (e.g. a data communications port conforming to a standard such as Universal Serial Bus (USB) or RS-232) of network 200.

Figure 2:
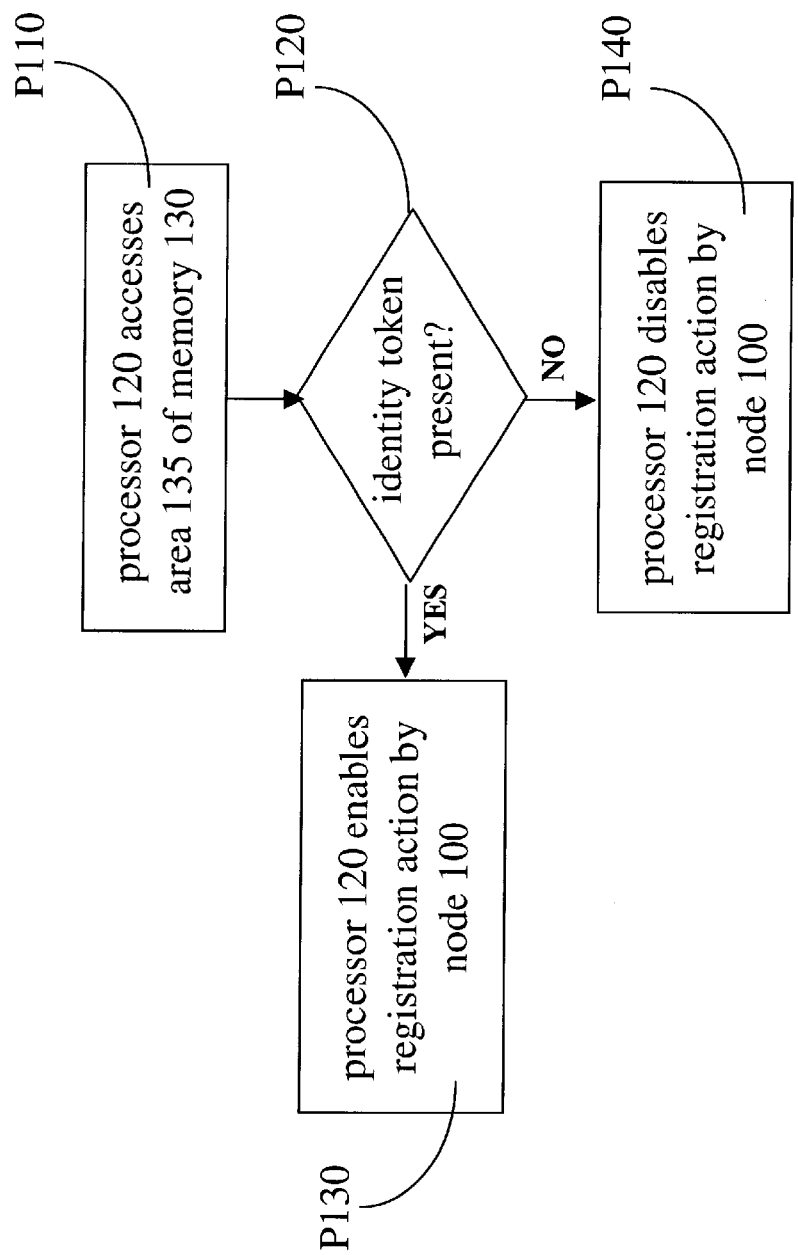
FIG. 2 shows a flow chart of a method according to an embodiment of the invention.

FIG. 2 shows a flowchart for a method according to an embodiment of the invention. Processor 120 may be connected and structured to carry out this method. Such a method may be performed within node 100 as a part of a power-up routine, for example. The method may also be performed in response to some other event such as the expiration of a timer maintained within node 100 or the detection of a change in signals received from network 200. The method may also be performed in association with the receipt of a command from network 200 and/or from a user of node 100 (e.g. via a keypad of node 100). In one implementation, the method is performed upon the occurrence of a registration event as described, for example, in section 6.6.5 ("Registration") of one of the TIA/EIA CDMA standards documents referenced above (e.g. power-up, timer expiration, or zone change).

In task P110, processor 120 receives a content of a predetermined area 135 of memory 130. Area 135 may be a dedicated portion of memory 130 or, alternatively, its location may be undetermined until some time before task P110. In one implementation, at least the predetermined area 135 of memory 130 is nonvolatile (e.g. information is retained in area 135 even after a supply of power is removed).

In task P120, processor 120 makes a registration decision. This decision includes at least a determination of whether the contents of area 135 include an identity token. In a general implementation, an identity token may be any identifier that may be recognized by network 200. For example, an identity token may be self-contained, providing all of the information necessary to uniquely characterize node 100. In an alternative implementation, the determination of task P120 depends upon whether a token that was assigned at least in part by network 200 is found in the contents of area 135.

Figure 3:
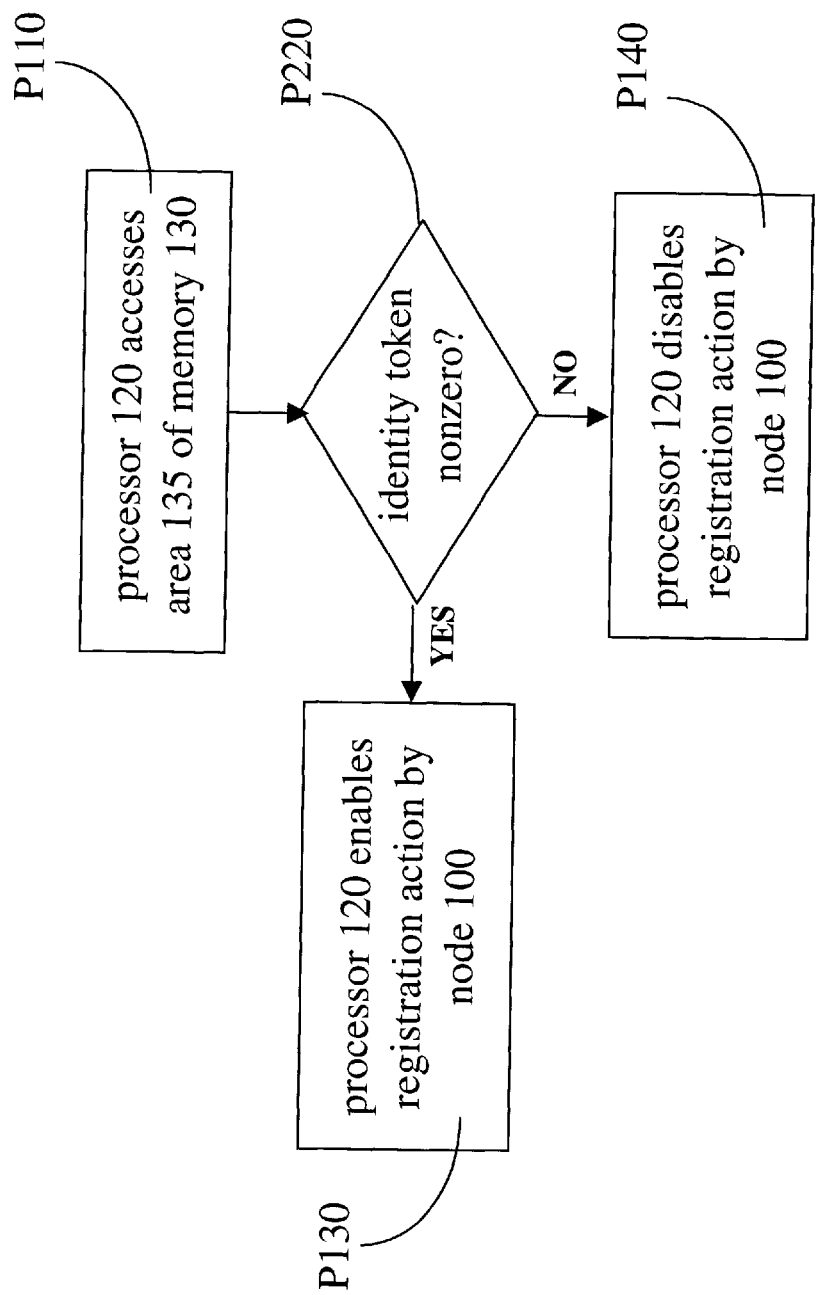
FIG. 3 shows a flow chart of a method according to another embodiment of the invention.

For a node that communicates with a CDMA network, for example, an identity token may include all of part of a MIN as described above. In one particular implementation, the identity token comprises the first six digits of the MIN, and the registration decision depends upon whether these six digits (as received from area 135) represent a nonzero value (e.g. as shown in task P220 of FIG. 3).

If the determination in task P120 succeeds, then in task P130 processor 120 enables node 100 to perform a registration action. This action may include transmitting a registration message from processor 120 via node transceiver 110 to registration entity 220 of network 200 over communications link 300. If the determination in task P120 fails, then in task P130 processor 120 disables node 100 from performing a registration action. This disabling may comprise setting or resetting the value of a control parameter internal to node 100. In a CDMA system according to one or more of the TIA/EIA standards referenced above, for example, setting the value of the control parameter REG_ENABLED to zero inhibits the transmission of registration messages by a mobile unit.

Figure 4:
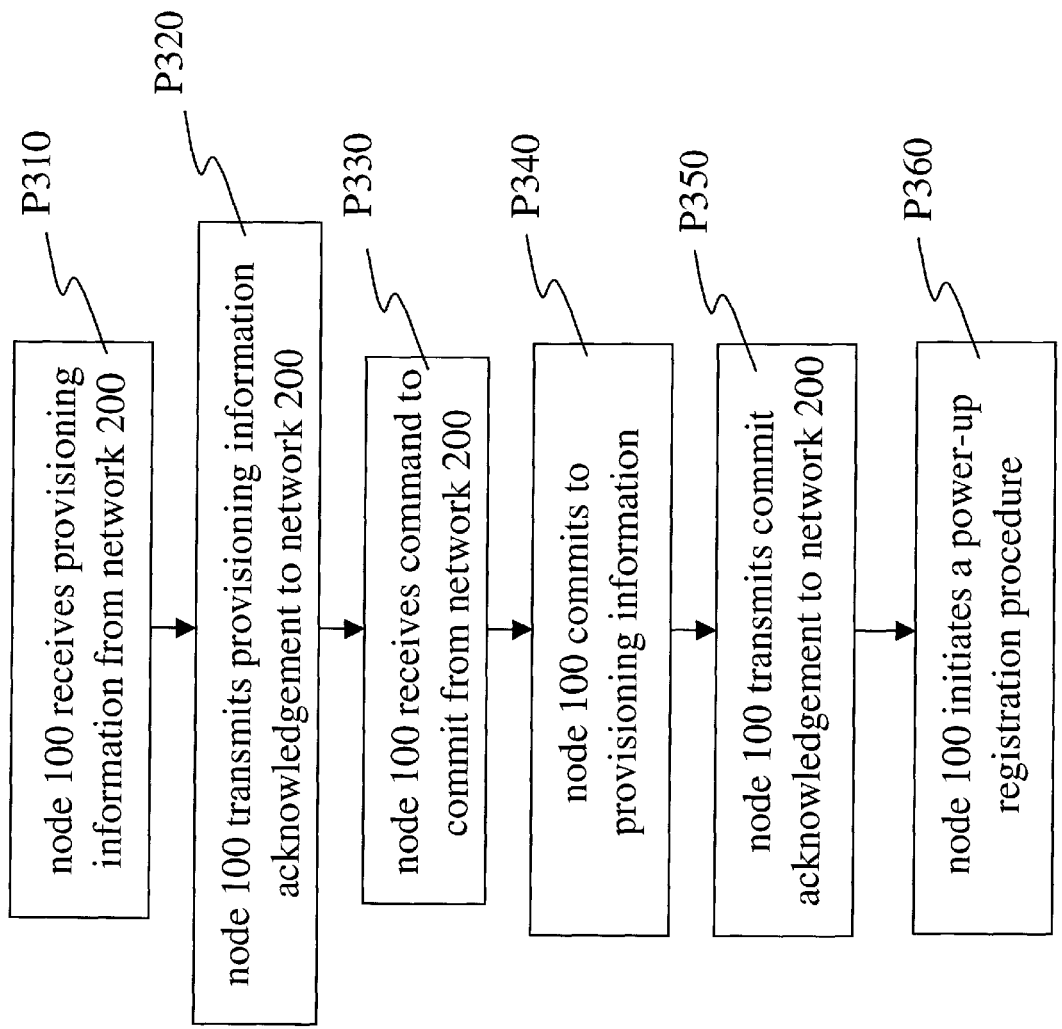
FIG. 4 shows a flowchart for a method according to a further embodiment of the invention.

As noted above, if a commit acknowledgement sent by node 100 during provisioning is lost, then network 200 cannot know whether the procedure was successfully completed. FIG. 4 shows a flowchart for a method according to a further embodiment of the invention. In task P310, node 100 receives provisioning information from network 200. This information may include, for example, information relating to an identity token. Upon receiving the provisioning information, node 100 transmits a provisioning information acknowledgement (task P320).

In task P330, node 100 receives a command to commit to the provisioning information. In task P340, node 100 commits to the provisioning information. In a general implementation, task P340 comprises storing information based at least in part on the provisioning information into memory 130. In a particular implementation, task P340 includes storing a nonzero information string into the first six digits of a MIN. Note that it may be desirable to commit the information stored in task P340 to a nonvolatile area of memory 130, so that such information may be retained even when node 100 is powered down.

Upon committing to the provisioning information, node 100 transmits a commit acknowledgement in task P350. In task P360, node 100 also initiates a power-up registration procedure. In an application to a CDMA system, task P360 may comprise a power-up registration procedure as described in Section 6.6.5.5.1.1 ("Registration Procedures: Actions in the Mobile Station Initialization State: Power-up or Serving System Change") of the TLA/EIA CDMA standards documents referenced above. Note that in certain implementations, task P350 may be omitted as redundant and unnecessary.

By disabling registration activity by node 100 when no identity token is present, a method or apparatus according to a described embodiment of the invention may extend the battery life of the communication device. When used in a CDMA system, such a method or apparatus may also reduce link interference and thereby increase system capacity by inhibiting futile registration activity. Moreover, a method or apparatus according to a described embodiment of the invention reduces system ambiguity when a commit acknowledgement transmitted by node 100 is not received by network 200.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile memory or a software program loaded from or into a data storage medium as machine-readable code, such code being instructions executable by an array of logic elements such as a microprocessor or other digital signal processing unit. Thus, the present invention is not intended to be limited to the embodiments shown above, any particular sequence of instructions, and/or any particular configuration of hardware but rather is to be accorded the widest scope consistent with the principles and novel features disclosed in any fashion herein.

What is claimed is:

1. An apparatus comprising:
   (1) a memory; and
   (2) a processor, wherein said processor is connected to:
      (A) receive a contents of a predetermined area of said memory, and
      (B) structured to make a registration decision for conducting a registration activity, the registration decision:
         (i) comprising a determination of whether the contents of said predetermined area of said memory includes an identity token; and
         (ii) relating to enabling a transmission of a registration messages,
      wherein the processor disables the registration activity if the processor determines that the predetermined area of the memory does not contain the identity token.

2. The apparatus of claim 1, wherein the processor is structured such that the registration decision:
   (a) relates to enabling a transmission of a registration message to a communications network, and
   (b) comprises a determination of whether the contents of said predetermined area of said memory includes an identity token assigned at least in part by the communications network.

3. The apparatus of claim 1, wherein the processor is structured such that the registration decision comprises a determination of whether the contents of said predetermined area of said memory has a nonzero value.

4. The apparatus of claim 1, wherein the processor is structured such that the registration decision relates to enabling a transmission of a registration message to a wireless code-division multiple access network for mobile communications.

5. The apparatus of claim 1, wherein the processor is structured such that transmission of a registration message is enabled when the registration decision comprises a determination that the contents of said area of said memory includes an identity token.

6. The apparatus of claim 1, wherein the processor is structured such that transmission of a registration message is enabled when the registration decision comprises a determination that the contents of said predetermined area of said memory has a nonzero value.

7. The apparatus of claim 1, wherein at least said predetermined area of said memory is nonvolatile.

8. A method comprising:
   (a) receiving a contents of a predetermined area of a memory; and
   (b) making a registration decision for conducting a registration activity, the registration decision:
      (1) comprising a determination of whether the contents of said predetermined area of said memory includes an identity token; and
      (2) relating to enabling a transmission of a registration message, wherein the processor disables the registration activity if the processor determines that the predetermined area of the memory does not contain the identity token.

9. The method of claim 8, wherein the registration decision:
   (a) relates to enabling a transmission of a registration message to a communications network; and
   (b) comprises a determination of whether the contents of said predetermined area of said memory includes an identity token assigned at least in part by the communications network.

10. The method of claim 8, wherein the registration decision comprises a determination of whether the contents of said predetermined area of said memory has a nonzero value.

11. The method of claim 8, wherein the registration decision relates to enabling a transmission of a registration message to a wireless code-division multiple access network for mobile communications.

12. The method of claim 8, wherein transmission of a registration message is enabled when the registration decision comprises a determination that the contents of said predetermined area of said memory includes an identity token.

13. The method of claim 8, wherein transmission of a registration message is enabled when the registration decision comprises a determination that the contents of said predetermined area of said memory has a nonzero value.

14. The method of claim 8, wherein at least said predetermined area of said memory is nonvolatile.

15. A data storage medium having machine-readable code stored thereon, the machine-readable code comprising instructions executable by an array of logic elements, the instructions defining a method comprising:
   (a) receiving a contents of a predetermined area of a memory; and
   (b) making a registration decision for conducting a registration activity, the registration decision:
      (1) comprising a determination of whether the contents of said predetermined area of said memory includes an identity token; and
      (2) relating to enabling a transmission of a registration message, wherein the processor disables the registration activity if the processor determines that the predetermined area of the memory does not contain the identity token.

16. The medium of claim 15, wherein the registration decision:
   (a) relates to enabling a transmission of a registration message to a communications network; and
   (b) comprises a determination of whether the contents of said predetermined area of said memory includes an identity token assigned at least in part by the communications network.

17. The medium of claim 15, wherein the registration decision comprises a determination of whether the contents of said predetermined area of said memory has a nonzero value.

18. The medium of claim 15, wherein the registration decision relates to enabling a transmission of a registration message to a wireless code-division multiple access network for mobile communications.

19. The medium of claim 15, wherein transmission of a registration message is enabled when the registration decision comprises a determination that the contents of said predetermined area of said memory includes an identity token.

20. The medium of claim 15, wherein transmission of a registration message is enabled when the registration decision comprises a determination that the contents of said predetermined area of said memory has a nonzero value.

21. A method comprising:
   (a) receiving provisioning information including information relating to an identity token;
   (b) upon said receiving provisioning information, transmitting a provisioning information acknowledgement;
   (c) receiving a command to commit to said provisioning information;
   (d) upon said receiving provisioning information and said receiving a command to commit, committing to said provisioning information;
   (e) upon said committing, initiating a power-up registration procedure; and
   (f) disabling the power-up registration procedure if the identity token is not received.

22. The method of claim 21, wherein said provisioning information includes information relating to an identity token.

23. The method of claim 21, wherein said transmitting a provisioning information acknowledgement comprises transmitting a provisioning information acknowledgement over a code-division multiple access radiolink.

24. The method of claim 21, wherein said initiating a power-up registration procedure comprises transmitting a registration message.

25. The method of claim 21, wherein said committing comprises storing information relating to at least a part of said provisioning information into a predetermined area of a memory.

26. The method of claim 25, wherein at least said predetermined area of said memory is nonvolatile.

* * * * *